(12) United States Patent　　(10) Patent No.: US 9,134,413 B2
Youn et al.　　(45) Date of Patent: Sep. 15, 2015

(54) METHOD OF MEASURING DISTANCE BOUND USING RADIO FREQUENCY IDENTIFICATION (RFID) AND SYSTEM THEREOF

(71) Applicant: Electronics and Telecommunications Research Institute, Daejeon (KR)

(72) Inventors: Taek Young Youn, Seongnam-si (KR); Do Won Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 253 days.

(21) Appl. No.: 13/732,997

(22) Filed: Jan. 2, 2013

(65) Prior Publication Data

US 2014/0062761 A1　Mar. 6, 2014

(30) Foreign Application Priority Data

Aug. 29, 2012　(KR) .................. 10-2012-0094656

(51) Int. Cl.
*H04Q 5/22* (2006.01)
*G07C 9/00* (2006.01)
*G05B 23/00* (2006.01)
*H04L 9/32* (2006.01)
*G06F 1/02* (2006.01)
*G01S 13/76* (2006.01)
*G01S 13/78* (2006.01)
*G06F 21/55* (2013.01)
*H04W 12/06* (2009.01)
(Continued)

(52) U.S. Cl.
CPC .............. *G01S 13/765* (2013.01); *G01S 13/78* (2013.01); *G06F 21/554* (2013.01); *H04W 12/06* (2013.01); *H04L 63/123* (2013.01); *H04W 12/12* (2013.01)

(58) Field of Classification Search
CPC .......... G06K 7/01; G06K 7/0008; H04L 9/32; H04Q 5/22; G07C 9/00111; G06F 7/588
USPC .................. 340/10.1–10.6, 572.1–572.9, 5.8; 342/44, 118; 713/168; 708/250
See application file for complete search history.

(56) References Cited

U.S. PATENT DOCUMENTS 5,959,568 A * 9/1999 Woolley .......................... 342/42
8,212,651 B2 * 7/2012 Bauchot et al. ................. 340/5.8
(Continued)

FOREIGN PATENT DOCUMENTS

KR　　100791622 B1　12/2007
KR　　101106265 B1　1/2012
KR　　1020120022003 A　3/2012

*Primary Examiner* — George Bugg
*Assistant Examiner* — Munear Akki
(74) *Attorney, Agent, or Firm* — William Park & Associates Ltd.

(57) ABSTRACT

A tag decides a response based on a plurality of queries received from a reader, determines whether to transmit the response, transmits the response to the reader according to the results of the determination, and transmits a message authentication code including communication content to the reader. The reader calculates a consumed time period which is the time difference between a transmission time at which the queries are transmitted and a reception time at which the response is received, calculates an average consumed time period of the consumed time period, and measures a distance to the tag based on the average consumed time period. Accordingly, it is possible to check an attacker's intervention with a high probability, thereby improving distance measurement performance. Also, the tag may efficiently perform computing and communication.

16 Claims, 4 Drawing Sheets

(51) Int. Cl.
*H04L 29/06* (2006.01)
*H04W 12/12* (2009.01)

(56) References Cited

U.S. PATENT DOCUMENTS

2004/0066278 A1* 4/2004 Hughes et al. ............... 340/10.1
2006/0181393 A1* 8/2006 Raphaeli ...................... 340/10.1
2009/0034725 A1 2/2009 Davies, Sr. et al.
2009/0096584 A1* 4/2009 Gravelle et al. .............. 340/10.1
2012/0176227 A1* 7/2012 Nikitin ......................... 340/10.2
2013/0057406 A1* 3/2013 Kaplan et al. ............... 340/572.1
2013/0187762 A1* 7/2013 Smith ........................... 340/10.1
2013/0223189 A1* 8/2013 Davis et al. ..................... 367/99

* cited by examiner

METHOD OF MEASURING DISTANCE BOUND USING RADIO FREQUENCY IDENTIFICATION (RFID) AND SYSTEM THEREOF

CLAIM FOR PRIORITY

This application claims priority to Korean Patent Application No. 10-2012-0094656 filed on Aug. 29, 2012 in the Korean Intellectual Property Office (KIPO), the entire contents of which are hereby incorporated by reference.

BACKGROUND

1. Technical Field

An example embodiment of the present invention relates in general to distance measurement technology, and more specifically, to a method of measuring a distance bound using radio frequency identification (RFID) for improving distance measurement performance, and a system thereof.

2. Related Art

Radio frequency identification (RFID) technology has been widely used as means for identifying objects by attaching RFID tags on items, such as people, animals, products, etc.

In general, an RFID system is composed of a reader, a tag, and a back-end database. The reader queries of the tag in order to obtain information stored in the memory of the tag, and receives information related to authentication from the tag. Then, the reader requests the tag to send information about the locations of all information associated with the tag, and uses the corresponding information for the purpose of various applications.

Since a reader can communicate with a tag only when it is located close to the tag, the reader can recognize that the tag is located within a communication radius when the tag transmits/receives signals to/from the reader. Also, RFID-based distance measurement is performed basically through query/response between a reader and a tag, and each query/response is limited to a very small amount of information.

However, RFID is vulnerable to various forms of attacks such as invasion of privacy.

That is, there is the case where an attacker responses to a query with an arbitrarily estimated value. Accordingly, setting a high probability that a value arbitrarily estimated by an attacker will be incorrect, is becoming important.

In other words, studies into a method for improving the performance of a system of measuring a distance bound based on RFID by lowering a probability that an attacker will pass a query/response procedure when he or she has not acquired important information, are needed.

SUMMARY

Accordingly, example embodiments of the present invention are provided to substantially obviate one or more problems due to limitations and disadvantages of the related art.

An example embodiment of the present invention provides a method of measuring a distance bound based on radio frequency identification (RFID), capable of improving distance measurement performance.

An example embodiment of the present invention also provides a system of measuring a distance bound based on radio frequency identification (RFID), capable of improving distance measurement performance.

In an example embodiment, there is provided a method in which a tag measures a distance bound, comprising: receiving a plurality of queries from a reader; deciding a response based on a query of the plurality of queries and a first bit created in advance through protocol initialization with the reader; determining whether or not to transmit the response based on another query of the plurality of queries and a second bit created in advance through the protocol initialization with the reader; transmitting the response to the reader if it is determined that the response has to be transmitted; and calculating a message authentication code regarding the receiving of the plurality of queries, the deciding of the response, the determining of whether or not to transmit the response, and the transmitting of the response, and transmitting the message authentication code to the reader.

In another example embodiment, there is provided a method in which a reader measures a distance bound, comprising: selecting a plurality of queries and transmitting the plurality of queries to a tag; measuring a transmission time at which the plurality of queries are transmitted; receiving at least one response corresponding to the plurality of queries from the tag; measuring a reception time at which the response is received, and calculating a consumed time period which is a time difference between the transmission time and the reception time; receiving a message authentication code from the tag, and verifying the message authentication code; and calculating an average consumed time period of the consumed time period if it is determined that the message authentication code is correct based on the results of the verification.

In still another example embodiment, there is provided a tag comprising: a tag processor configured to decide a response based on a query of a plurality of queries received from a reader and a first bit created in advance through protocol initialization, to determine whether or not to transmit the response to the reader based on another query of the plurality of queries and a second bit created in advance through the protocol initialization, to transmit the response according to the results of the determination, to calculate a message authentication code, and to transmit the message authentication code to the reader; and a tag transceiver configured to communicate with the reader.

In still another example embodiment, there is provided A reader comprising: a processor configured to select a plurality of queries and transmit the plurality of queries to a tag, to measure a transmission time at which the plurality of queries are transmitted, and a reception time at which a response is received from the tag, to calculate a consumed time period which is a time difference between the transmission time and the reception time, and to calculate an average of the consumed time period if a message authentication code received from the tag is verified; and a transceiver configured to communicate with the tag.

According to the method and system for measuring the distance bound based on RFID, as described above, if the tag decides a response based on a plurality of queries received from the reader, determines whether to transmit the response, transmits the response to the reader, and then transmits a message authentication code including communication content to the reader, the reader calculates an average time period of a consumed time period which is the time difference between a transmission time at which the queries are transmitted and a reception time at which the response is received, and measures a distance between the reader and the tag based on the average time period.

Accordingly, by lowering the probability that an attacker will pass a query/response procedure when he or she has not acquired important information, it is possible to improve the performance of the system of measuring the distance bound based on RFID. Also, the tag may efficiently perform computing and communication.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, embodiments of the present invention will be described in detail with reference to the appended drawings. In the following description, for easy understanding, like numbers refer to like elements throughout the description of the figures, and the same elements will not be described further.

Figure 1:
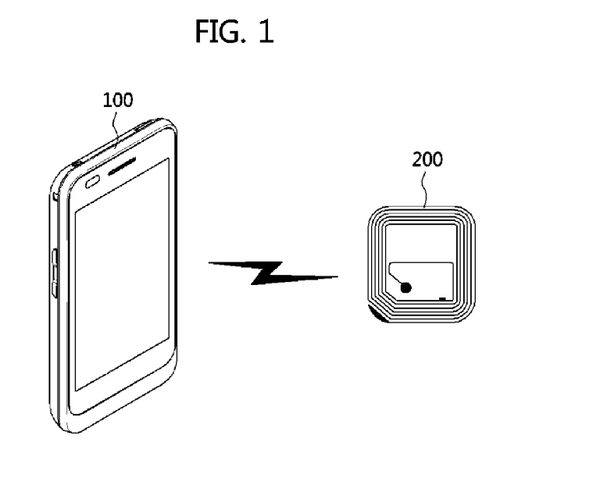
FIG. 1 is a conceptual view showing an environment in which a system of measuring a distance bound based on radio frequency identification (RFID), according to an embodiment of the present invention, operates.

FIG. 1 is a conceptual view showing an environment in which a system of measuring a distance bound based on radio frequency identification (RFID), according to an embodiment of the present invention, operates;

Referring to FIG. 1, the system of measuring the distance bound based on RFID may include a reader 100 and a tag 200.

First, a process of initializing a protocol between the reader 100 and the tag 200 for measurement of a distance bound based on RFID will be described below.

It is assumed that the reader 100 and the tag 200 share the same secret random numbers. A method and procedure of sharing the secret random number s between the reader 100 and the tag 200 are not limited.

If the tag 200 is located within a communication radius, the reader 100 sends a signal to initialize a protocol for measuring a distance bound. The reader 100 selects a random number $n_a$, and transmits the random number $n_a$ to the tag 200 that is located in the communication range.

The tag 200 selects a new random number $n_b$ in response to the received random number $n_a$, and transmits the new random number $n_b$ to the reader 100.

The reader 100 calculates a ∥ b=h(s, $n_a$, $n_b$) based on the random number $n_b$ received from the tag 200 using a cryptographic hash function h(*) to create system bits a and b, and prepares a query/response procedure.

Here, a ∥ b means that the system bits a and b are created by dividing the output value of h(s, $n_a$, $n_b$), and the i-th bits of the system bits a and b are referred to as $a_i$ and $b_i$.

The tag 200 calculates a ∥ b=h(s, $n_a$, $n_b$) based on the random number $n_a$ received from the reader 100 using the cryptographic hash function h(*) to create the system bits a and b, and prepares the query/response procedure.

A method of creating the system bits a and b is not limited as long as it is in the range of the above-described purpose.

Hereinafter, it is assumed that the reader 100 and the tag 200 have created and stored the system bits a and b therein.

Referring to FIG. 1, the reader 100 transmits a plurality of queries to the tag 200, and measures a time at which the queries are transmitted to the tag 200.

Here, the queries may include random numbers $c_i$ and $m_i$, wherein the random number $c_i$ may be used for the tag 200 to decide a response value, and the random number $m_i$ may be used for the tag 200 to decide an operation mode when the tag 200 responds to the queries.

Also, if the reader 100 receives a response corresponding to the queries from the tag 200, the reader 100 calculates a consumed time period $\Delta T_i$ (i is a natural number greater than 1) at a time at which the response has been received, wherein the consumed time period $\Delta T_i$ is a time period consumed from when the queries have been transmitted to when the response has been received.

The reader 100 repeatedly executes a process of selecting a predetermined number of queries according to a reliability level required by a user, transmitting the predetermined number of queries to the tag 200, and measuring a transmission time at which the queries are transmitted to the tag 200, and a process of measuring a time at which a response corresponding to the queries is received, and calculating a consumed time period $\Delta T_i$.

Also, the reader 100 executes the processes repeatedly by a predetermined number of times, then verifies $MAC_s(c, m, r)$ which is a message authentication code received from the tag 200, and calculates, if the $MAC_s(c, m, r)$ is correct based on the results of the verification, an average consumed time period $\Delta T$ of the consumed time periods $\Delta T_i$ using Equation 1 below.

$$\Delta T = (\Delta T_1 + \ldots + \Delta T_n)/n', \quad (1)$$

where n' is a natural number greater than 1, and represents the number of times by which $\Delta T_i$ has been calculated since a response has been received from the tag 200, among the predetermined number of times.

The reader 100 may measure a distance to the tag 200 based on the average consumed time period $\Delta T$.

The tag 200 receives the queries from the reader 100, and decides a response $r_i$ based on the system bit $a_i$ created in advance through protocol initialization and the query $c_i$ of the queries $c_i$ and $m_i$.

Also, the tag 200 determines whether to transmit the response $r_i$ to the reader 100 based on the system bit $b_i$ created in advance through protocol initialization and the query $m_i$ of the queries $c_i$ and $m_i$. If the tag 200 determines that the response $r_i$ has to be transmitted to the reader 100, the tag 200 transmits the response $r_i$ to the reader 100.

The tag 200 executes a process of receiving the queries from the reader 100, deciding a response, determining whether to transmit the response, and transmitting the response, repeatedly, by a predetermined number of times.

Also, the tag 200 calculates $MAC_s(c, m, r)$ which is a message authentication code regarding communication content executed by the predetermined number of times, and transmits the $MAC_s(c, m, r)$ to the reader 100.

According to the system of measuring the distance bound based on RFID, as described above, it is possible to check an attacker's intervention with a high probability, and reduce a required number of query/response procedures for providing high reliability.

Figure 2:
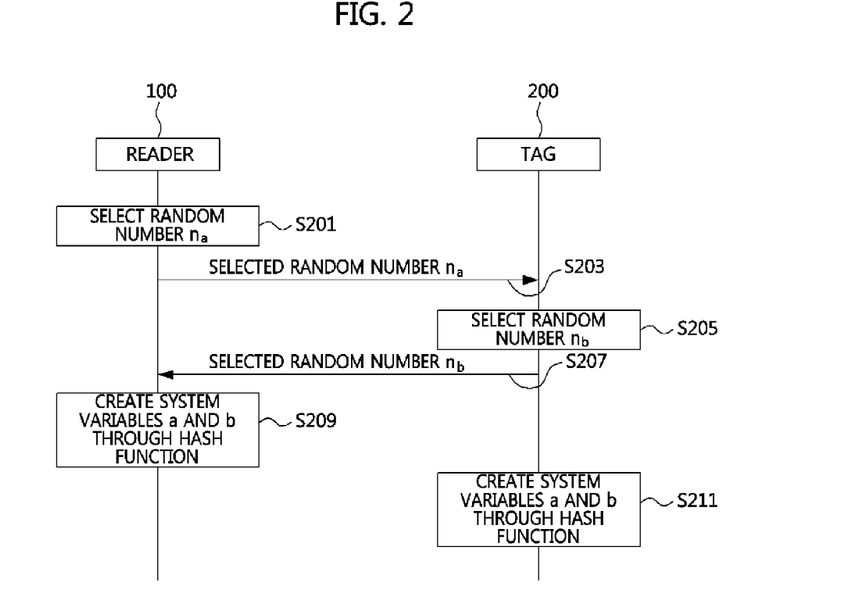
FIG. 2 is a flowchart illustrating a method of initializing a protocol between a reader and a tag for measurement of a distance bound based on RFID, according to an embodiment of the present invention.

FIG. 2 is a flowchart illustrating a process of initializing a protocol between a reader 100 and a tag 200 for measurement of a distance bound based on RFID, according to an embodiment of the present invention.

First, it is assumed that the reader 100 and the tag 200 share a secret random number s, and a method of sharing the secret random number s is not limited.

Referring to FIG. 2, the reader 100 selects a random number $n_a$ (S201), and transmits the random number $n_a$ to the tag 200 that is located within a communication radius (S203).

The tag 200 selects a new random number $n_b$ corresponding to the random number $n_a$ received from the reader 100 (S205), and transmits the new random number $n_b$ to the reader 100 (S207).

Then, the reader 100 calculates $a \| b = h(s, n_a, n_b)$ based on the random number $n_b$ received from the tag 200 using a cryptographic hash function h(*) to create system bits a and b (S209).

Also, the tag 200 calculates $a \| b = h(s, n_a, n_b)$ based on the random number $n_a$ received from the reader 100 using the cryptographic hash function h(*) to create the system bits a and b (S211).

The i-th bits of the system bits a and b are referred to as $a_i$ and $b_i$, and a method of creating the system bits a and b is not limited as long as it is in the range of the above-described purpose.

Figure 3:
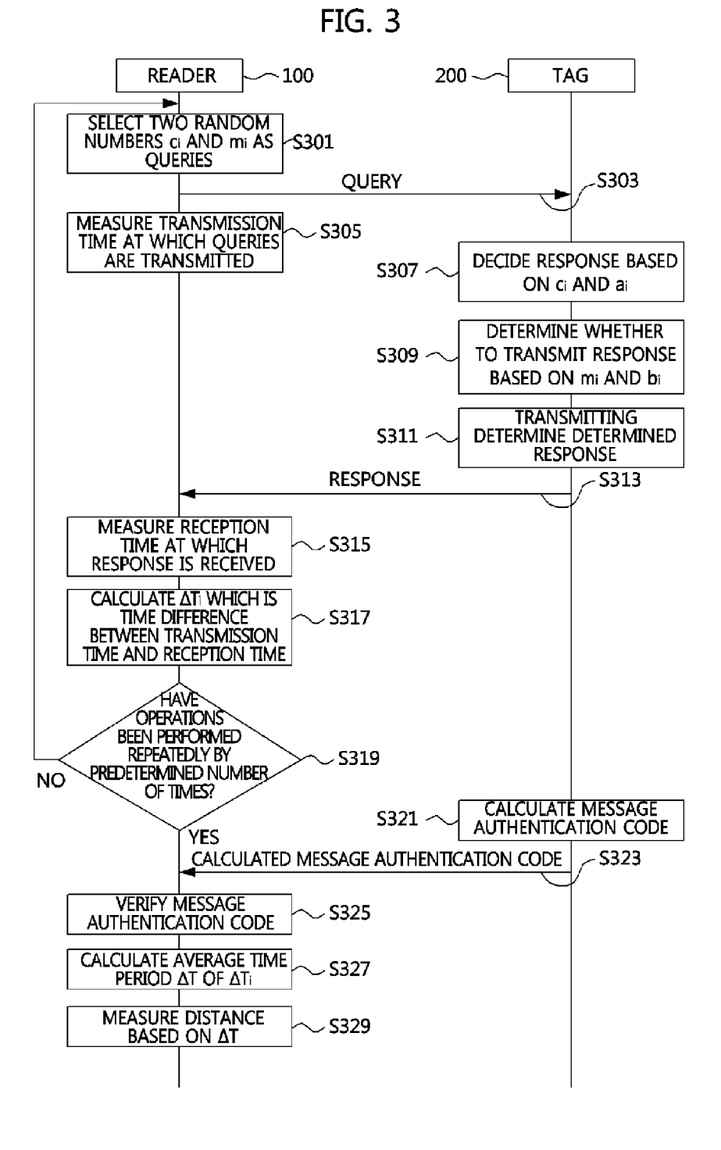
FIG. 3 is a flowchart illustrating a method of measuring a distance bound, which is performed by a system of measuring a distance bound based on RFID, according to an embodiment of the present invention.

FIG. 3 is a flowchart illustrating a method of measuring a distance bound, which is performed by the system of measuring the distance bound based on RFID, according to an embodiment of the present invention.

Referring to FIG. 3, a reader 100 selects two random numbers $c_i$ and $m_i$ as queries (S301), and transmits the queries $c_i$ and $m_i$ to a tag 200 (S303).

Then, the reader 100 measures a transmission time at which the queries $c_i$ and $m_i$ are transmitted to the tag 200 (S305).

The tag 200 receives the queries $c_i$ and $m_i$ from the reader 100, and decides a response $r_i$ (S307) based on the received query $c_i$ and a bit $a_i$ created in advance through protocol initialization (S307).

In detail, if $c_i=0$, the tag 200 decides $a_i$ as a response $r_i$, and if $c_i=1$, the tag 200 decides $\bar{a}_i$ which is the bit complement of as a response $r_i$.

However, it is also possible that if $c_i=1$, the tag 200 decides $a_i$ as a response $r_i$, and if $c_i=0$, the tag 200 decides $\bar{a}_i$ which is the bit complement of as a response $r_i$.

Thereafter, the tag 200 determines whether to transmit the response $r_i$ to the reader 100, based on the received query $m_i$ and a bit $b_i$ created in advance through protocol initialization (S309).

If the tag 200 determines that the response $r_i$ has to be transmitted to the reader 100 (S311), the tag 200 transmits the response $r_i$ to the reader 100 (S313).

The reader 100 receives the response $r_i$ from the tag 200, and measures a time at which the response $r_i$ is received (S315).

Thereafter, the reader 100 calculates a consumed time period $\Delta T_i$ at the time at which the response $r_i$ has been received, wherein the consumed time period $\Delta T_i$ is the time difference between the time at which the queries $c_i$ and $m_i$ have been transmitted, and the time at which the response $r_i$ has been received (S317).

Then, the reader 100 determines whether operations S301, S303, S305, S315, and S317 have been performed repeatedly by a predetermined number of times (S319).

If operations S301, S303, S305, S315, and S317 have been performed repeatedly by the predetermined number of times, the tag 200 calculates $MAC_s(c, m, r)$ which is a message authentication code regarding executed communication content (S321).

Then, the tag 200 transmits the $MAC_s(c, m, r)$ to the reader 100 (S323).

The reader 100 verifies the $MAC_s(c, m, r)$ received from the tag 200 (S325).

If the $MAC_s(c, m, r)$ is correct based on the results of the verification, the reader 100 calculates an average consumed time period ΔT of the consumed time periods $ΔT_i$, and measures a distance to the tag 200 based on the average consumed time period ΔT (S329).

Figure 4:
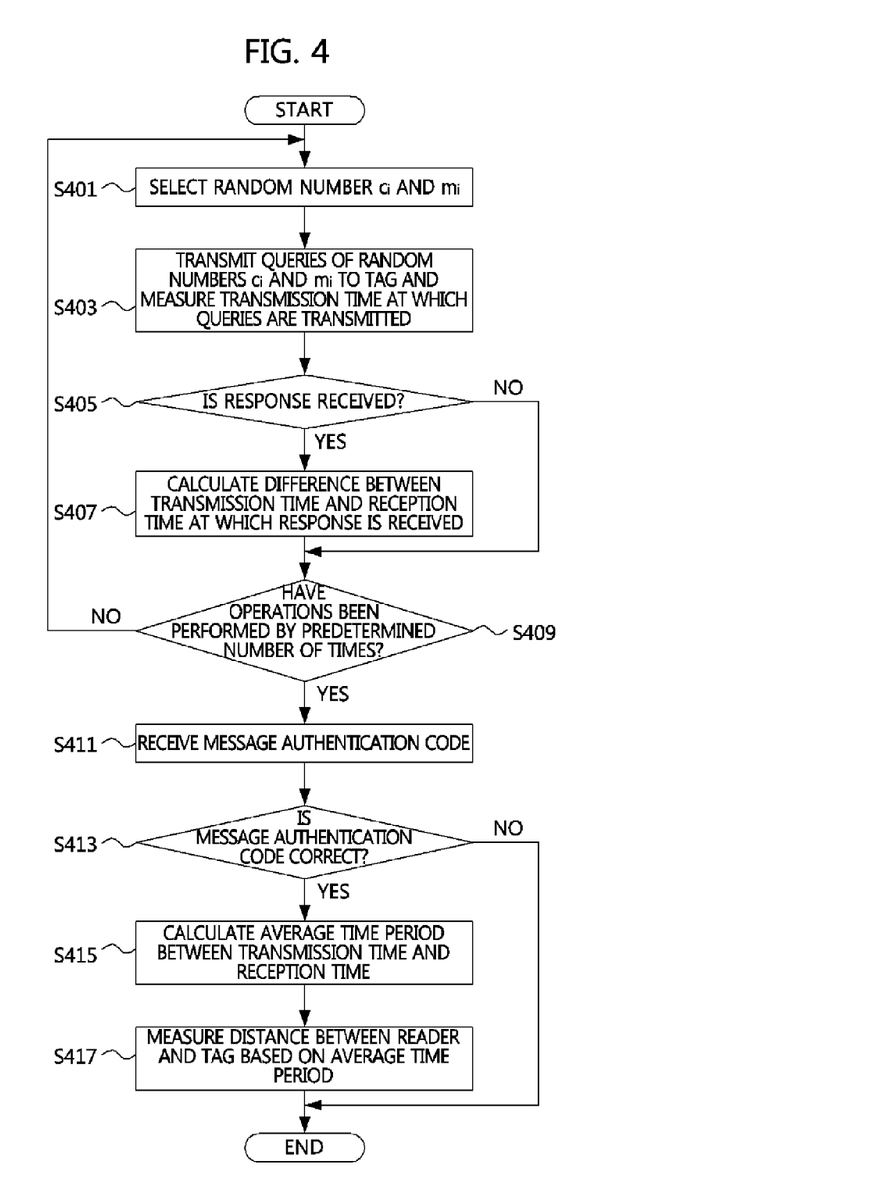
FIG. 4 is a flowchart illustrating a method of measuring a distance bound based on RFID, which is performed by a reader, according to an embodiment of the present invention.

FIG. 4 is a flowchart illustrating a process of measuring a distance bound based on RFID, which is performed by the reader 100 (see FIG. 1), according to an embodiment of the present invention.

Hereinafter, it is assumed that the reader 100 and the tag 200 (see FIG. 1) have created system bits a and b through protocol initialization and stored them therein.

Referring to FIG. 4, the reader 100 selects random numbers $c_i$ and $m_i$ as queries (S401).

The reader 100 transmits the selected queries $c_i$ and $m_i$ to the tag 200, and measures a time at which the queries $c_i$ and $m_i$ are transmitted (S403).

The random number $c_i$ is used for the tag 200 to decide a response $r_i$, and the random number $m_i$ is used for the tag 200 to determine whether to transmit the response $r_i$ to the reader 100.

Thereafter, the reader 100 determines whether a response $r_i$ corresponding to the queries $c_i$ and $m_i$ is received from the tag 200 (S405).

If a response $r_i$ is received from the tag 200, the reader 100 calculates a consumed time period $ΔT_i$ (i is a natural number greater than 1) at the time which the response $r_i$ has been received, wherein the consumed time period $ΔT_i$ is the time difference between the time at which the queries $c_i$ and $m_i$ have been transmitted and the time at which the response $r_i$ has been received (S407).

Then, the reader 100 determines whether operations S401, S403, S405, and S407 have been performed repeatedly by a predetermined number of times (S409), and if it is determined that operations S401, S403, S405, and S407 have not been performed repeatedly by the predetermined number of times, the reader 100 performs operations S401, S403, S405, and S407 repeatedly by the predetermined number of times.

If it is determined that operations S401, S403, S405, and S407 have been performed repeatedly by the predetermined number of times, the reader 100 receives $MAC_s(c, m, r)$ which is a message authentication code regarding executed communication content, from the tag 200 (S411).

Here, c represents all of $c_i$, m represents all of $m_i$, and r represents all of $r_i$.

The reader 100 verifies the $MAC_s(c, m, r)$ received from the tag 200 to determine whether the $MAC_s(c, m, r)$ is correct (S413).

If it is determined that the $MAC_s(c, m, r)$ is correct based on the results of the verification, the reader 100 calculates an average consumed time period ΔT of the consumed time periods $ΔT_i$ calculated during the query/response procedure (S415).

The average consumed time period ΔT of the consumed time periods $ΔT_i$ can be calculated by Equation 2 below.

$$ΔT=(ΔT_1+ \ldots +ΔT_n)/n', \quad (2)$$

where n' represents a total number of times by which a response has been received from the tag 200.

The reader 100 measures a distance to the tag 200 based on the average consumed time period ΔT.

Figure 5:
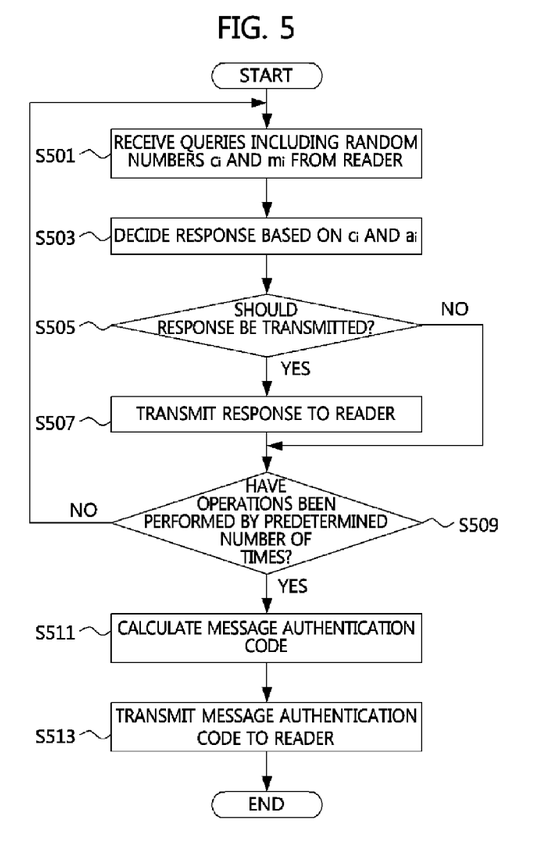
FIG. 5 is a flowchart illustrating a method of measuring a distance bound based on RFID, which is performed by a tag, according to an embodiment of the present invention.

FIG. 5 is a flowchart illustrating a process of measuring a distance bound based on RFID, which is performed by the tag 200 (see FIG. 1), according to an embodiment of the present invention.

Referring to FIG. 5, the tag 200 receives queries $c_i$ and $m_i$ from the reader 100 (see FIG. 1) (S501).

The tag 200 decides a response $r_i$ based on the query $c_i$ and a bit $a_i$ created in advance through protocol initialization (S503).

If $c_i$=0, the tag 200 decides the bit $a_i$ as a response, and if $c_i$=1, the tag 200 decides $\bar{a}_i$ which is the bit complement of $a_i$, as a response $r_i$.

However, it is also possible that if $c_i$=1, the tag 200 decides $a_i$ as a response $r_i$, and if $c_i$=0, the tag 200 decides $\bar{a}_i$ which is the bit complement of as a response $r_i$.

Here, the bit complement means operation of changing "0" to "1" or "1" to "0".

Then, the tag 200 determines whether or not to transmit the response $r_i$ to the reader 100 based on the query $m_i$ and the bit $b_i$ created in advance through protocol initialization (S505).

If $m_i$=$b_i$, the tag 200 transmits the response $r_i$ to the reader 100, and if $m_i$≠ $b_i$, the tag 200 does not transmit the response $r_i$ to the reader 100.

If it is determined that the response $r_i$ has to be transmitted to the reader 100, the tag 200 transmits the response $r_i$ to the reader 100 (S507).

Then, the tag 200 determines whether operations S501, S503, S505, and S507 have been performed repeatedly by a predetermined number of times (S509).

If it is determined that operations S501, S503, S505, and S507 have been performed repeatedly by the predetermined number of times, the tag 200 calculates $MAC_s(c, m, r)$ which is a message authentication code regarding executed communication content (S511).

Here, c represents all of $c_i$, m represents all of $m_i$, and r represents all of $r_i$.

The tag 200 transmits the $MAC_s(c, m, r)$ to the reader 100 (S513).

According to the method of measuring the distance bound based RFID, as described above, a tag having low computing power and low communication capability can create a response in correspondence to a plurality of queries through a relatively small number of operations, and measure a distance bound without having to transmit a large number of responses.

Figure 6:
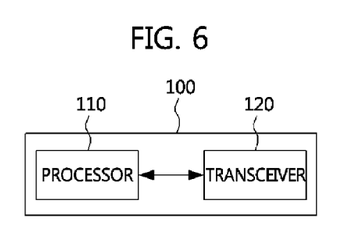
FIG. 6 is a block diagram illustrating the configuration of a reader for measuring a distance bound based on RFID, according to an embodiment of the present invention.

FIG. 6 is a block diagram illustrating the configuration of a reader 100 for measuring a distance bound based on RFID, according to an embodiment of the present invention.

Referring to FIG. 6, the reader 100 may include a processor 110 and a transceiver 120.

The processor 110 selects random numbers $c_i$ and $m_i$ as queries, transmit the queries $c_i$ and $m_i$ to a tag 200 (see FIG. 1), and measures a time at which the queries $c_i$ and $m_i$ are transmitted to the tag 200.

Here, $c_i$ is used for the tag 200 to decide a response $r_i$, and $m_i$ is used for the tag 200 to determine whether or not to transmit a response corresponding to the queries $c_i$ and $m_i$ to the reader 100.

Also, the processor 110 determines whether the response $r_i$ corresponding to the queries $c_i$ and $m_i$ is received from the tag 200 through the transceiver 120.

Also, if the response $r_i$ is received from the tag 200, the processor 110 calculates a consumed time period $ΔT_i$ (i is a natural number greater than 1) at the time at which the response $r_i$ has been received, wherein the consumed time period $ΔT_i$ is the time difference between the time at which the queries $c_i$ and $m_i$ have been transmitted and the time at which the response $r_i$ has been received.

Thereafter, the processor 110 determines whether transmission of the queries $c_i$ and reception of the response and calculation of the consumed time period $\Delta T_i$ have been performed repeatedly by a predetermined number of times, and if transmission of the queries $c_i$ and $m_i$, reception of the response $r_i$, and calculation of the consumed time period $\Delta T_i$ have not been performed repeatedly by the predetermined number of times, the processor 110 performs transmission of the queries $c_i$ and $m_i$, reception of the response $r_i$, and calculation of the consumed time period $\Delta T_i$ by the predetermined number of times.

Meanwhile, if transmission of the queries $c_i$ and $m_i$, reception of the response $r_i$, and calculation of the consumed time period $\Delta T_i$ have been performed repeatedly by the predetermined number of times, the processor 110 receives $MAC_s(c, m, r)$ which is a message authentication code regarding executed communication content from the tag 200.

Here, c represents all of $c_i$, m represents all of $m_i$, and r represents all of $r_i$.

The processor 110 verifies the $MAC_s(c, m, r)$ to determine whether the $MAC_s(c, m, r)$ is correct (S413). If it is determined that the $MAC_s(c, m, r)$ is correct based on the results of the verification, the processor 110 calculates an average consumed time period $\Delta T$ of the consumed time periods $\Delta T_i$ calculated during the query/response procedure.

The average consumed time period $\Delta T$ of the consumed time periods $\Delta T_i$ can be calculated by Equation 3 below.

$$\Delta T = (\Delta T_1 + \ldots + \Delta T_n)/n', \quad (3)$$

where n' represents a total number of times by which a response has been received from the tag 200.

The processor 110 measures a distance to the tag 200 based on the average consumed time period $\Delta T$.

The transceiver 120, which can transmit/receive information to/from the tag 200 wirelessly, provides information received from the tag 200 to the processor 110, and transmit the information provided by the processor 110 to the tag 200.

Figure 7:
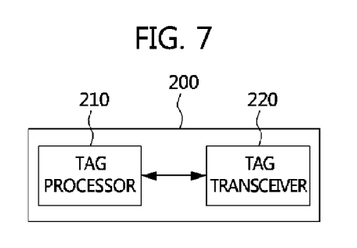
FIG. 7 is a block diagram illustrating the configuration of a tag for measuring a distance bound based on RFID, according to an embodiment of the present invention.

FIG. 7 is a block diagram illustrating the configuration of a tag 200 for measuring a distance bound based on RFID, according to an embodiment of the present invention.

Referring to FIG. 7, the tag 200 may include a tag processor 210 and a tag transceiver 220.

The tag processor 210 decides a response $r_i$ based on the query $c_i$ of queries $c_i$ and $m_i$ received from the reader 100 and a bit $a_i$ created in advance through protocol initialization.

In detail, if $c_i=0$, the tag processor 210 decides $a_i$ as a response $r_i$, and if $c_i=1$, the tag processor 210 decides $\bar{a}_i$ which is the bit complement of $a_i$, as a response $r_i$.

However, it is also possible that if $c_i=1$, the tag processor 210 decides $a_i$ as a response and if $c_i=0$, the tag processor 210 decides $\bar{a}_i$ which is the bit complement of as a response $r_i$.

Here, the bit complement means operation of changing "0" to "1" or "1" to "0".

Then, the tag processor 210 determines whether or not to transmit the response $r_i$ to the reader 100 based on the query $m_i$ and a bit $b_i$ created in advance through protocol initialization.

If $m_i=b_i$, the tag processor 210 transmits the response $r_i$ to the reader 100, and if $m_i \neq b_i$, the tag processor 210 does not transmit the response $r_i$ to the reader 100.

If it is determined that the response $r_i$ has to be transmitted to the reader 100, the tag processor 210 transmits the response $r_i$ to the reader 100.

Then, the tag processor 210 determines that reception of the queries $c_i$ and decision of the response $r_i$, determination on whether to transmit the decided response ri, and transmission of the decided response $r_i$ have been performed repeatedly by a predetermined number of times. If reception of the queries $c_i$ and $m_i$, decision of the response ri, determination on whether to transmit the decided response $r_i$, and transmission of the decided response $r_i$ have not been performed repeatedly by the predetermined number of times, the tag processor 210 performs reception of the queries $c_i$ and $m_i$, decision of the response $r_i$, determination on whether to transmit the decided response $r_i$, and transmission of the decided response $r_i$, repeatedly, by the predetermined number of times.

Meanwhile, if reception of the queries $c_i$ and $m_i$, decision of the response $r_i$, determination on whether to transmit the decided response $r_i$, and transmission of the decided response $r_i$ have been performed repeatedly by the predetermined number of times, the tag processor 210 calculates $MAC_s(c, m, s)$ which is a message authentication code regarding executed communication content.

Here, c represents all of $c_i$, m represents all of $m_i$, and r represents all of $r_i$.

Then, the tag processor 210 transmits the $MAC_s(c, m, s)$ to the reader 100 through the tag transceiver 220.

The tag transceiver 220 receives information from the reader 100 wirelessly, provides the information to the tag processor 210, and transmits information provided by the tag processor 210 to the reader 100 wirelessly.

According to the method and system of measuring the distance bound based on RFID, as described above, the tag 200 having low computing power and low communication capability can create a response in correspondence to a plurality of queries through a relatively small number of operations, and can measure a distance bound without having to transmit a large number of responses.

While the example embodiments of the present invention and their advantages have been described in detail, it should be understood that various changes, substitutions and alterations may be made herein without departing from the scope of the invention.

What is claimed is:

1. A method in which a tag assists in measuring a distance bound, the method comprising:
   receiving a plurality of queries from a reader;
   deciding a response value based on a random number $c_i$ included in each query of the plurality of queries and a first bit created in advance through protocol initialization with the reader;
   determining whether or not to transmit a response including the response value based on a random number $m_i$ included in each query of the plurality of queries and a second bit created in advance through the protocol initialization with the reader;
   transmitting the response to the reader if it is determined that the response has to be transmitted; and
   calculating a message authentication code based on the random number $c_i$, the random number $m_i$, and the response value, and transmitting the message authentication code to the reader.

2. The method of claim 1, further comprising:
   performing the receiving of the plurality of queries, the deciding of the response value, the determining of whether or not to transmit the response including the response value, and the transmitting of the response, repeatedly, by a predetermined number of times, and
   wherein the calculating of the message authentication code further comprises calculating the message authentication code based on c, m, and r, where c is all of $c_i$, m is all of $m_i$, and r is all of the response values, from the repeated pluralities of queries.

3. The method of claim 1, wherein the deciding of the response value comprises deciding the first bit or a bit complement of the first bit, as the response value, based on the random number $c_i$.

4. The method of claim 1, wherein the determining of whether or not to transmit the response comprises determining that the response is transmitted to the reader if the second bit is identical to the random number $m_i$, and determining that the response is not transmitted to the reader if the second bit is not identical to the random number $m_i$.

5. A method in which a reader measures a distance bound, the method comprising:
   selecting a plurality of queries and transmitting the plurality of queries to a tag, the plurality of queries comprising each query including a random number $c_i$ and a random number $m_i$;
   measuring a transmission time at which the plurality of queries are transmitted;
   in response to the plurality of queries, receiving, depending on the random number $m_i$, at least one response $r_i$ which is based on the random number $c_i$;
   measuring a reception time at which the response is received, and
   calculating a consumed time period which is a time difference between the transmission time and the reception time;
   receiving from the tag a message authentication code which is based on the random number $c_i$, the random number $m_i$, and the response $r_i$, and verifying the message authentication code; and
   calculating an average consumed time period of the consumed time period if it is determined that the message authentication code is correct based on the results of the verification.

6. The method of claim 5, further comprising:
   performing the transmitting of the plurality of queries, the measuring of the transmission time, the receiving of the response, and the calculating of the consumed time period, repeatedly, by a predetermined number of times, and
   wherein the receiving of the message authentication code further comprises receiving the message authentication code which is based on c, m, and r where c is all of $c_i$, m is all of $m_i$, and r is all of $r_i$, from the repeated pluralities of queries.

7. A tag comprising:
   a tag processor configured to decide a response value based on a random number $c_i$ included in each query of a plurality of queries received from a reader and a first bit created in advance through protocol initialization, to determine whether or not to transmit a response including the response value to the reader based on a random number $m_i$ included in each query of the plurality of queries and a second bit created in advance through the protocol initialization, to transmit the response according to the results of the determination, to calculate a message authentication code based on the random number $c_i$, the random number $m_i$, and the response value, and to transmit the message authentication code to the reader; and
   a tag transceiver configured to communicate with the reader.

8. The tag of claim 7, wherein the tag processor repeatedly performs operation of deciding the response value based on a random number $c_i$ included each query of a predetermined number of queries received from the reader and the first bit, operation of determining whether or not to transmit the response to the reader based on a random number $m_i$ included in each query of the predetermined number of queries and the second bit, and operation of transmitting the response according to the results of the determination.

9. The tag of claim 7, wherein the tag processor decides the first bit or a bit complement of the first bit, as the response, based on the random number $c_i$.

10. The tag of claim 7, wherein the tag processor transmits the response to the reader if the second bit is identical to the random number $m_i$, and does not transmit the response to the reader if the second bit is not identical to the random number $m_i$.

11. The tag of claim 8, wherein the tag processor calculates the message authentication code based on c, m, and r where c is all of $c_i$, m is all of $m_i$, and r is all of $r_i$ from the repeated pluralities of queries.

12. The method of claim 1, wherein the distance bound is measured by the reader based on a time difference between a transmission time of the plurality of queries and a reception time of the response.

13. The method of claim 5, wherein the at least one response $r_i$ is based on the random number $c_i$ and a first bit created in advance through protocol initialization with the tag.

14. The method of claim 5, wherein the at least one response $r_i$ is received depending on the random number $m_i$ and a second bit created in advance through the protocol initialization with the tag.

15. The method of claim 5, wherein the at least one response $r_i$ is based on the random number $c_i$ and a first bit created in advance through protocol initialization with the tag, and the at least one response $r_i$ is received depending on the random number $m_i$ and a second bit created in advance through the protocol initialization with the tag.

16. The method of claim 5, further comprising:
   performing the transmitting of the plurality of queries, the measuring of the transmission time, the receiving of the response $r_i$, and the calculating of the consumed time period, repeatedly, by a predetermined number of times, and
   wherein the average consumed time period is calculated based on the consumed time periods that were repeatedly calculated.

* * * * *